July 7, 1931.  W. C. KLEIN  1,813,856
DIRECT DRIVE FOR ANTIFRICTION ROLLER BEARING FREE WHEELS
Filed Dec. 11, 1930

INVENTOR.
W. C. Klein,
BY
ATTORNEY.

Patented July 7, 1931

1,813,856

UNITED STATES PATENT OFFICE

WILLIAM C. KLEIN, OF ALLENTOWN, PENNSYLVANIA

DIRECT DRIVE FOR ANTIFRICTION ROLLER BEARING FREE WHEELS

Application filed December 11, 1930. Serial No. 501,726.

The invention relates to means for driving railroad cars and similar vehicles by means of electric motors, the invention relating particularly to the driving of vehicles equipped with antifriction roller bearing free wheels of the type substantially as shown in my patent application filed September 5, 1929, Serial No. 390,558, wherein the wheels on the opposite ends of each axle are secured for rotation with sleeves rotatably mounted on the axle, thus permitting the wheels at opposite ends of the axle to turn at difference speeds and prevent dragging in rounding curves, and has for its object the provision of an electric motor for each of the sleeves on the axle in which one of the elements of the motor in each instance is secured to the sleeve, and the other elements cooperating with the first mentioned elements are secured to a casing or housing that is secured to the truck frame carrying the axle, thus permitting the sleeves and wheels to be driven at different speeds to accommodate the driving means to rounding curves and eliminating drag in one of the wheels.

Figure 1:
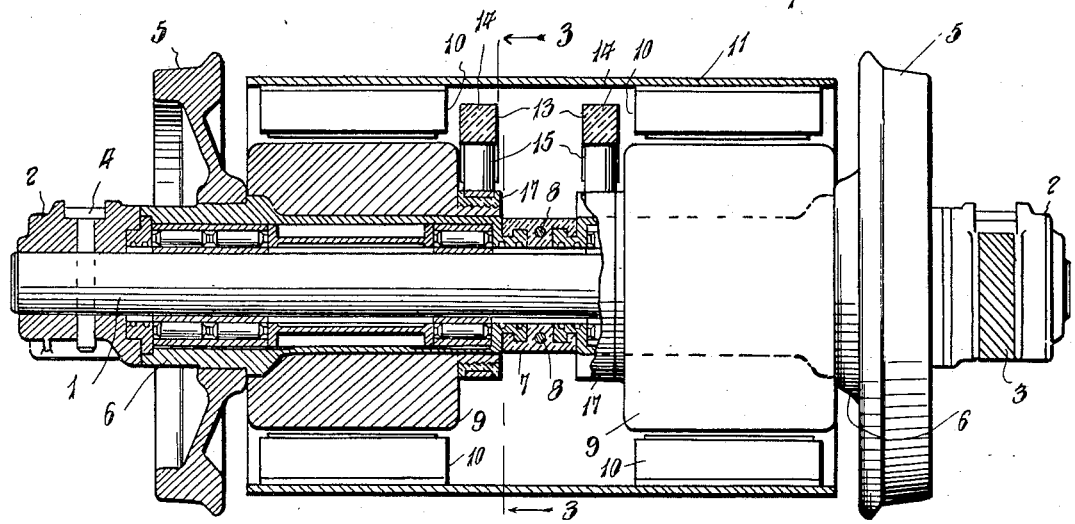
Figure 2:
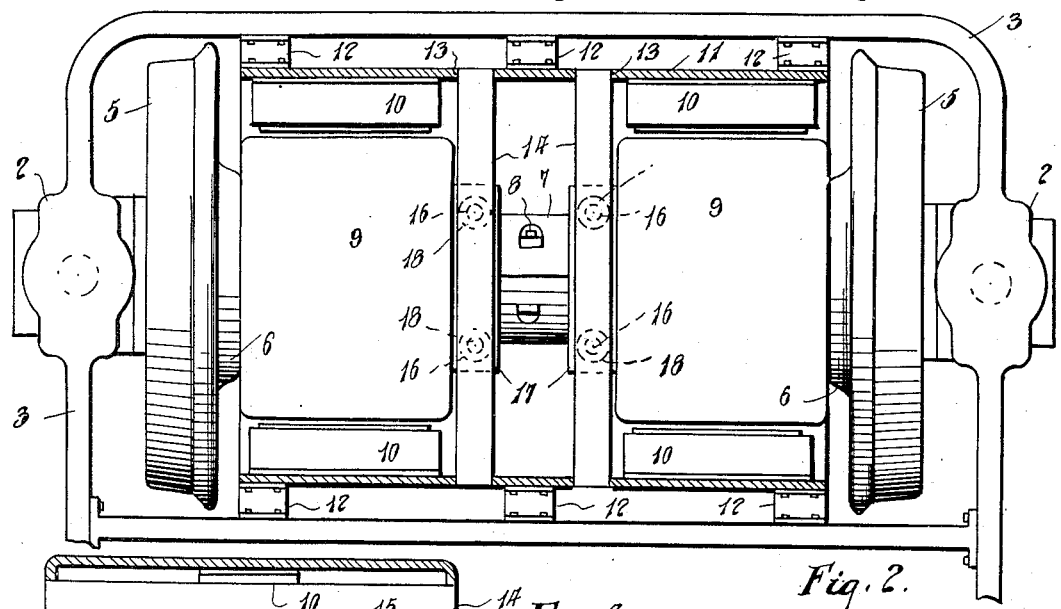
Figure 3:
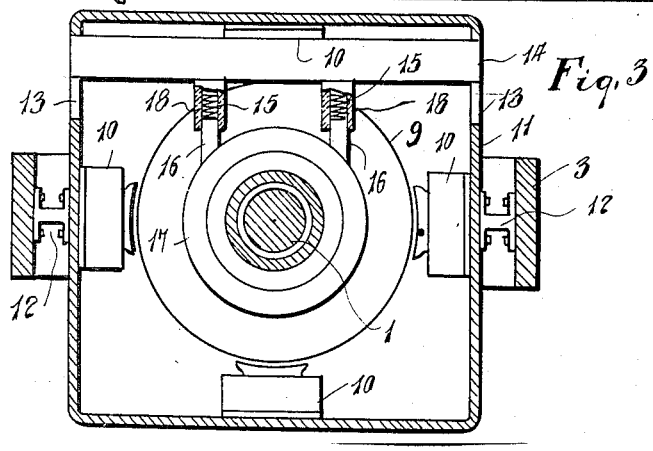

The invention will be described in detail hereinafter and will be found illustrated in the accompanying drawings in which Figure 1 is an end view partly in section showing one unit of a rolling bearing free wheel with the motors in position, Figure 2 is a top plan view partly in section, and Figure 3 is a transverse sectional view on a plane indicated by the line 3—3 of Figure 1.

In the drawings similar reference characters are used to designate corresponding parts throughout the several views.

The roller bearing free wheel hereinbefore referred to, is mounted on an axle 1 that is supported in pedestal blocks 2, comprising parts of truck frame 3, by means of pins 4 or by any other suitable means. The wheels 5 are secured to sleeves 6 rotatably mounted on said axle 1, and coupled together by means of a split sleeve 7 held in assembled relation by means of bolts 8, said split sleeve 7 being so connected with the sleeves 6 as to permit relative rotation of said sleeves on the axle.

The parts hereinbefore described are substantially shown in the application hereinbefore referred to and for particular description of parts reference is made to said other application. This invention has for its object the provision of means for driving separately the sleeves 6 for traction of the wheels 5 by means of separate electric motors associated with said sleeves, and the construction has been selected as illustrated in the drawings in which armature members 9 are secured for rotation with the sleeves 6, while field members or pole pieces 10 are secured to and sustained by a housing or casing 11, said housing or casing 11 being secured to the frame 3 by means of brackets 12. The side walls of the casing or housing 11 are provided with slots 13 in which are slidably mounted bars 14 of insulating material and having socket members 15 secured thereto in which are slidably mounted the brushes 16 cooperating with the commutators 17, 18 indicating the springs normally urging the brushes 16 into engagement with said commutators 17. It will be understood that by the provision of the construction described whereby the bars 14 are mounted in the slots 13, provision is made for vertical as well as lateral movement of said bars 14 relatively to the casing or housing 11, and it will also be apparent that for renewal and replacement of the brushes 16 the bars 14 may be removed through the slots 13.

By providing the separate motor elements, as hereinbefore described, for the two sleeves at the opposite ends of the axle shaft 1, provision is made whereby either sleeve may turn with a greater speed relatively to the other sleeve to accommodate a truck to rounding curves and eleminating drag in either of the wheels.

It will be apparent that the invention is applicable to alternating current types of motors as well as the direct current type and I do not therefore limit myself to the application of the invention to either type.

What is claimed is:—

1. In combination with a car truck frame, an axle secured to and supporting the frame, sleeves mounted for rotation on said axle, a wheel secured to and rotatable with each sleeve, a housing secured to said frame and surrounding the sleeves, electric motors for driving said sleeves, an element of each motor secured to each sleeve, and another element of each motor secured to the housing and arranged to cooperate with each of the first mentioned elements.

2. In combination with a car truck frame, an axle secured to and supporting said frame, sleeves mounted for rotation on said axle, a wheel secured to and rotatable with each sleeve, a housing carried by the frame, armature means and field means within said housing, one of said means being secured to each sleeve and the other means secured to the housing.

3. In combination with a car truck frame, an axle secured to the frame, sleeves rotatably mounted on the axles, a coupling member connecting adjacent ends of said sleeves and permitting relative rotation thereof, wheels secured for rotation with the sleeves, a housing carried by the frame and surrounding said coupled sleeves, armature means secured to each of said sleeves, and the field means secured to said housing and cooperating with said armature means to differentially drive the sleeves and wheels secured thereto.

In testimony whereof I affix my signature.

WILLIAM C. KLEIN.